(12) United States Patent
Chen (10) Patent No.: US 11,882,531 B2
(45) Date of Patent: Jan. 23, 2024

(54) ASSISTANCE INFORMATION REPORTING METHOD AND TERMINAL (71) Applicant: VIVO MOBILE COMMUNICATION CO., LTD., Guangdong (CN)

(72) Inventor: Li Chen, Guangdong (CN)

(73) Assignee: Vivo Mobile Communication Co., Ltd., Guangdong (CN)

( * ) Notice: Subject to any disclaimer, the term of this patent is extended or adjusted under 35 U.S.C. 154(b) by 279 days.

(21) Appl. No.: 17/389,422

(22) Filed: Jul. 30, 2021

(65) Prior Publication Data

US 2021/0360544 A1 Nov. 18, 2021

Related U.S. Application Data (63) Continuation of application No. PCT/CN2020/073788, filed on Jan. 22, 2020.

(30) Foreign Application Priority Data

Jan. 31, 2019 (CN) .......................... 201910101377.9

(51) Int. Cl.
*H04B 7/00* (2006.01)
*H04W 52/54* (2009.01)
*H04W 52/30* (2009.01)

(52) U.S. Cl.
CPC ........... *H04W 52/54* (2013.01); *H04W 52/30* (2013.01)

(58) Field of Classification Search
CPC ..... H04W 52/02; H04W 52/54; H04W 52/30; H04W 28/0221; H04W 28/0861; H04W 36/00725
See application file for complete search history.

(56) References Cited

U.S. PATENT DOCUMENTS

| 8,364,193 | B1* | 1/2013 | Pawar | .................. | H04W 52/265 |
|---|---|---|---|---|---|
| | | | | | 455/127.1 |
| 10,085,172 | B2 | 9/2018 | Jian et al. | | |
| 2013/0301500 | A1 | 11/2013 | Koc et al. | | |
| 2014/0044029 | A1* | 2/2014 | Chou | ................ | H04W 52/0216 |
| | | | | | 370/331 |

(Continued)

FOREIGN PATENT DOCUMENTS

| CN | 103428683 A | 12/2013 |
|---|---|---|
| CN | 103581885 A | 2/2014 |

(Continued)

OTHER PUBLICATIONS

Vivo, "UE assistance information design for power saving", 3GPP TSG-RAN WG2 Meeting #105bis, R2-1903205, Xi'an, China, Apr. 8-Apr. 12, 2019.

(Continued)

*Primary Examiner* — Tuan Pham
(74) *Attorney, Agent, or Firm* — Price Heneveld LLP (57) ABSTRACT

An assistance information reporting method and a terminal are provided. The method includes: reporting first assistance information to a network side device, where the first assistance information includes at least one of capability information, combination indication information of the capability information, power saving indication information, and transmit power profile indication information.

16 Claims, 2 Drawing Sheets

(56) References Cited

U.S. PATENT DOCUMENTS

| | | | |
|---|---|---|---|
| 2015/0105062 A1* | 4/2015 | Quan | H04W 76/27 |
| | | | 455/418 |
| 2015/0156615 A1 | 6/2015 | Gao et al. | |
| 2016/0249405 A1* | 8/2016 | Koc | H04L 69/321 |
| 2016/0381730 A1 | 12/2016 | Jain et al. | |
| 2019/0246323 A1* | 8/2019 | Kim | H04W 36/305 |
| 2020/0404617 A1* | 12/2020 | Murray | H04W 68/02 |

FOREIGN PATENT DOCUMENTS

| | | |
|---|---|---|
| CN | 108924857 A | 11/2018 |
| CN | 111278042 A | 6/2020 |
| KR | 101593358 B1 | 2/2016 |

OTHER PUBLICATIONS

"3rd Generation Partnership Project; Technical Specification Group Radio Access Network; NR; Radio Resource Control (RRC) protocol specification (Release 15)", 3GPP TS 38.331 V15.4.0 (Dec. 2018), Valbonne, France.

"3rd Generation Partnership Project; Technical Specification Group Radio Access Network; Evolved Universal Terrestrial Radio Access (E-UTRA); Radio Resource Control (RRC); Protocol specification(Release 15)", 3GPP TS 36.331 V15.4.0 (Dec. 2018), Valbonne, France.

Mediatek Inc., Summary of email discussion [103bis#12][NR/UE cap SI] UE cap ID signalling options (MediaTek), 3GPP TSG-RAN WG2 Meeting #104, R2-181682, Spokane, Washington, USA, Nov. 12-16, 2018.

ZTE, "Report of email discussion [101#65][LTE/MTC R15] Lower power class UE", 3GPP TSG-RAN2 Meeting #101bis, R2-1805963, Sanya, China, Apr. 15-20, 2018.

Nokia, "UE assistance information for UE power saving and optimized network performance", 3GPP TSG-RAN WG2 Meeting #77bis, R2-121203, Jeju, Korea, Mar. 26-30, 2012.

* cited by examiner

ASSISTANCE INFORMATION REPORTING METHOD AND TERMINAL

CROSS-REFERENCE TO RELATED APPLICATIONS

This application is a continuation application of a PCT Application No. PCT/CN2020/073788 filed on Jan. 22, 2020, which claims priority to Chinese Patent Application No. 201910101377.9, filed on Jan. 31, 2019 in China, the disclosures of which are incorporated herein by reference in their entireties.

TECHNICAL FIELD

The present disclosure relates to the field of communications technologies, and in particular, to an assistance information reporting method and a terminal.

BACKGROUND

Scheduling on a terminal by a network side device may be determined based on capability information of the terminal. However, the capability information of the terminal does not change based on different service requirements. Scheduling on the terminal by the network side device may fail to meet different service requirements of the terminal or adapt to different terminal states, resulting in relatively large power consumption during communication of the terminal.

SUMMARY

Embodiments of the present disclosure provide an assistance information reporting method and a terminal.

The present disclosure is implemented as follows:

According to a first aspect, some embodiments of the present disclosure provide an assistance information reporting method. The method is applied to a terminal and includes:

reporting first assistance information to a network side device, where the first assistance information includes at least one of capability information, combination indication information of the capability information, power saving indication information, and transmit power profile indication information.

According to a second aspect, some embodiments of the present disclosure provide a terminal, including:

a reporting module, configured to report first assistance information to a network side device, where the first assistance information includes at least one of capability information, combination indication information of the capability information, power saving indication information, and transmit power profile indication information.

According to a third aspect, some embodiments of the present disclosure provide a terminal, including a memory, a processor, and a program that is stored in the memory and that can be run by the processor, where when the program is executed by the processor, the steps of the assistance information reporting method provided in the first aspect of some embodiments of the present disclosure are implemented.

According to a fourth aspect, some embodiments of the present disclosure provide a computer-readable storage medium, where the computer-readable storage medium stores a computer program, and when the computer program is executed by a processor, the steps of the assistance information reporting method provided in the first aspect of some embodiments of the present disclosure are implemented.

BRIEF DESCRIPTION OF DRAWINGS

To describe the technical solutions in the embodiments of the present disclosure more clearly, the following briefly describes the accompanying drawings required for describing the embodiments of the present disclosures. Apparently, the accompanying drawings in the following description show merely some embodiments of the present disclosure, and a person of ordinary skill in the art may still derive other drawings from these accompanying drawings.

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

The term "include" and any other variants in the specification and claims of this application mean to cover the non-exclusive inclusion, for example, a process, method, system, product, or device that includes a list of steps or units is not necessarily limited to those steps or units, but may include other steps or units not expressly listed or inherent to such a process, method, product, or device. In addition, in the specification and claims, "and/or" is used to indicate at least one of connected objects. For example, A and/or B represents the following three cases: Only A is included, only B is included, and both A and B exist.

In some embodiments of the present disclosure, the word such as "example" or "for example" is used to represent giving an example, an illustration, or a description. Any embodiment or design scheme described as "example" or "for example" in some embodiments of the present disclosure should not be explained as being more preferred or having more advantages than another embodiment or design scheme. Exactly, use of the term "example" or "for example" is intended to present a concept in a specific manner.

The embodiments of the present disclosure are described below with reference to the accompanying drawings. An assistance information reporting method provided in some embodiments of the present disclosure may be applied to a wireless communications system. The wireless communications system may be a 5G system, or an evolved Long Term Evolution (eLTE) system, or a subsequent evolved communications system.

Figure 1:
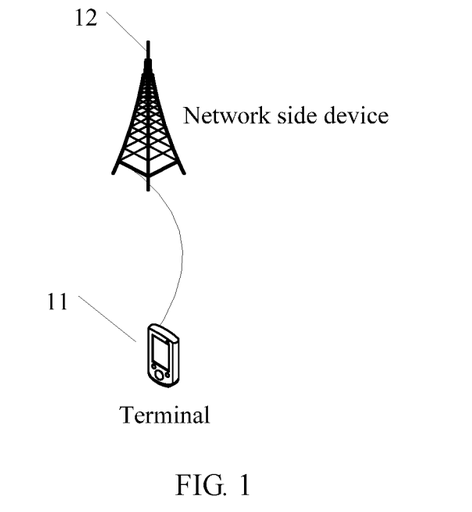
FIG. 1 is a system diagram of an assistance information reporting system according to some embodiments of the present disclosure.

FIG. 1 is a structural diagram of an assistance information reporting system according to some embodiments of the present disclosure. As shown in FIG. 1, the system includes a terminal 11 and a network side device 12. The terminal 11 may be a mobile communications device such as a mobile phone, a tablet personal computer, a laptop computer, a personal digital assistant (PDA), a mobile Internet device (MID), or a wearable device. It should be noted that a specific type of the terminal 11 is not limited in some embodiments of the present disclosure. The network side device 12 may be a 5G network side device (for example, gNB or 5G NR NB), or may be a 4G network side device (for example, an eNB), or may be a 3G network side device (for example, an NB), or a network side device in a subsequent evolved communications system. It should be noted that a specific type of the network side device 12 is not limited in some embodiments of the present disclosure.

The terminal may report capability information and assistance information to the network side device.

A manner of reporting capability information by the terminal is as follows: After the terminal accesses a network, if a RAN (radio access network) side node can obtain capability information of the terminal from a core network side node, the capability information of the terminal is directly obtained from the core network side node, and the network side device schedules the terminal based on the obtained capability information. If the RAN side node does not have a capability of obtaining the capability information of the terminal, or cannot obtain the capability information of the terminal from the core network side node, the network side device may deliver a capability inquiry message to the terminal. After receiving the capability inquiry message, the terminal may report the capability information of the terminal to the network side device. After receiving the capability information, the network side device may send the capability information to the core network side node for storage, and performing scheduling based on the capability information of the terminal.

It can be learned from the above that the foregoing manner of reporting capability information by the terminal has relatively large limitations. When the RAN (radio access network) side node does not have the capability of obtaining the capability information of the terminal; or even if the RAN side node has the capability of obtaining the capability information of the terminal but cannot obtain the capability information of the terminal from the core network side node; or if the RAN side node does not obtain the capability information of the terminal, and the network side device does not deliver the capability inquiry message, the network side device cannot perform scheduling based on the capability information of the terminal. Therefore, scheduling on the terminal by the network side device cannot meet different service requirements of the terminal, or cannot adapt to different terminal states, thereby resulting relatively large power consumption during communication of the terminal.

A manner of reporting assistance information by the terminal is as follows: In an LTE (Long Term Evolution) system and an NR (new radio) system, reporting of user auxiliary information (UE assistance information) is introduced due to factors such as overheating of the terminal. The assistance information reported by the terminal mainly includes parameters that affect a rate of the terminal, such as a terminal supported carrier, a bandwidth, and a multi-antenna MIMO (multi-input multi-output) layer, and is actively reported only when the terminal detects overheating.

It can be learned from the above that the foregoing manner of reporting the assistance information by the terminal has relatively large limitations.

In view of this, some embodiments of the present disclosure provide an assistance information reporting system shown in FIG. 1, and provide an assistance information reporting method applied to the assistance information reporting system. Details are as follows:

A terminal reports first assistance information to a network side device, where
the first assistance information includes at least one of capability information, combination indication information of the capability information, power saving indication information, and transmit power profile indication information.

In some embodiments of the present disclosure, assistance information reported by the terminal to the network side device may assist the network side device in scheduling the terminal, thereby effectively reducing power consumption of the terminal and improving communication performance of the terminal. In some embodiments of the present disclosure, the assistance information may be actively reported to the network side device in a case that the terminal detects an internal exception, or may be reported in a case that indication information sent by the network side device is received, and reporting manners of the assistance information are flexible and diverse, so that different service requirements and different terminal states of the terminal can be met in a timely manner.

Figure 2:
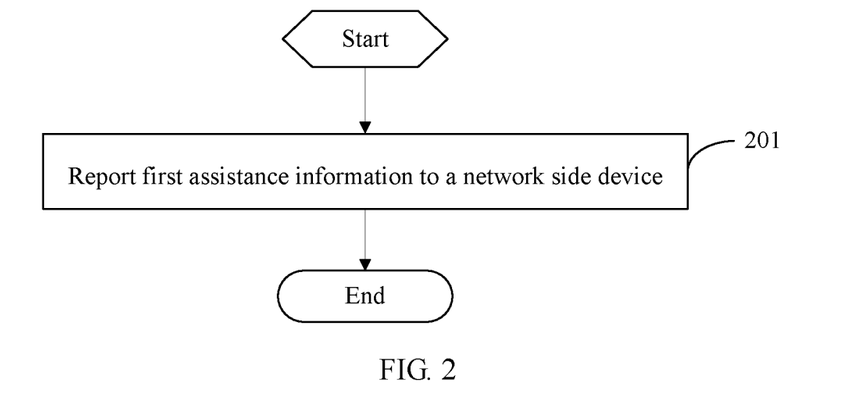
FIG. 2 is a flowchart of an assistance information reporting method according to some embodiments of the present disclosure.

FIG. 2 is a flowchart of an assistance information reporting method according to some embodiments of the present disclosure. As shown in FIG. 2, the assistance information reporting method is applied to a terminal, and the method includes the following steps:

Step 201: Report first assistance information to a network side device.

The first assistance information includes at least one of capability information, combination indication information of the capability information, power saving indication information, and transmit power profile indication information.

In one aspect, the terminal may add the capability information and/or the combination indication information of the capability information to the first assistance information.

The combination indication information of the capability information may be used to indicate a combination of all capability information of the terminal, or may be used to indicate a combination of partial capability information. All or partial capability information of the terminal may be combined through this mapping relationship, for example, there is a correspondence between capabilities such as a MIMO layer and a buffer size of the terminal, and these correspondences are combined into several parameter sets. The terminal may report this parameter set to represent different capability combinations in the set. The combination indication information of the capability information may be used to indicate a configuration parameter expected by the terminal.

The terminal may add the capability information and/or the combination indication information of the capability information to the first assistance information. In this way, the network side device may configure, for the terminal based on the capability information and/or the combination indication information of the capability information, the configuration parameter expected by the terminal.

In addition, the terminal can simultaneously report the capability information by reporting assistance information. The network side device may schedule the terminal based on the capability information in the first assistance information, thereby reducing communication expenses and power consumption required by the terminal to report the assistance information and the capability information.

In another aspect, the terminal may add the power profile indication information to the first assistance information, where the power profile indication information is newly defined indication information and may be interpreted as transmit power profile indication information, and other similar definitions are applicable. The power profile indication information may include parameters related to a transmit power of the terminal, such as a maximum transmit power and a transmit/receive loss.

The power profile indication information may be used to indicate a power configuration parameter that is expected by the terminal to reduce power consumption of the terminal. The power configuration parameter indicated by the power profile indication information may include one or more parameter configurations, for example, at least one of a MIMO layer, a BWP (Bandwidth Part) configuration, a quantity of secondary cells Scell, and a carrier aggregation bandwidth.

The terminal may add the power profile indication information to the first assistance information. In this way, the network side device may configure, for the terminal based on the power profile indication information, the power configuration parameter that can reduce power consumption of the terminal.

In another aspect, the terminal may add the power saving indication information to the first assistance information, where the power saving indication information may be used to indicate whether the terminal needs to save power or is in a power saving mode. In this way, the first assistance information carries the power saving indication information, and in a case that the power saving indication information indicates that the terminal needs to save power or is in a power saving mode, the network side device may configure a wake-up frequency at a lower frequency for the terminal, or configure another configuration parameter that can save power for the terminal.

In another aspect, the terminal may actively report the first assistance information to the network side device in a case that the terminal detects that an internal exception (for example, heating), or may report the first assistance information in a case that indication information sent by the network side device is received.

Compared with the manner in which the first assistance information is actively reported to the network side device only when heating is detected, the manner of reporting the first assistance information is more flexible, and different service requirements and different terminal states of the terminal can be met in a timely manner.

Optionally, the first assistance information is reported in a case that first indication information sent by the network side device is received.

The first indication information may be used for one of the following:
  requesting (or asking) the terminal to report assistance information;
  requesting (or asking) the terminal to report temporary capability information;
  indicating that the terminal is allowed to enable a power saving mode; and
  indicating that the terminal is allowed to report assistance information.

Optionally, if the terminal does not receive the first indication information sent by the network side device, the terminal does not report the first assistance information.

Optionally, the first assistance information is reported through any one of Msg1 (message 1), Msg3 (message 3), and Msg5 (message 5) in a random access process.

When the first assistance information is reported through Msg1, the capability information, the combination indication information of the capability information, the power saving indication information, and the power profile indication information may be distinguished by using different preambles or preamble groups in Msg1.

When the first assistance information is reported through Msg3, the first assistance information may be carried in Msg3.

When the first assistance information is reported through Msg5, the first assistance information may be carried in Msg5.

In addition, the first assistance information may further be reported through existing UE assistance information.

Optionally, the first assistance information is reported on a basis of at least one of a BWP, a CC (component carrier), a carrier, a terminal, and an FR (frequency range).

In other words, the first assistance information may be on a basis of at least one of a Per-BWP (that is, one piece of first assistance information is reported for each BWP), a Per-CC (that is, one piece of first assistance information is reported for each carrier aggregation), a Per-carrier (that is, one piece of first assistance information is reported for each carrier), Per-UE (that is, one piece of first assistance information is reported for each terminal), and a Per-FR (that is, one piece of first assistance information is reported for each frequency range).

In some embodiments of the present disclosure, a timer may further be defined, and the first assistance information may be reported during running of the timer.

In this way, the assistance information reporting method in some embodiments of the present disclosure may further include: starting a timer.

During running of the foregoing timer, the first assistance information may always be valid.

In addition, to ensure normal reporting of the first assistance information, some embodiments of the present disclosure may further specify that the terminal cannot report new assistance information during running of the timer. In other words, during running of the timer, the terminal is not allowed to report second assistance information.

The second assistance information may be understood as assistance information that is newer than the first assistance information. Generally, the second assistance information is reported after the first assistance information.

In some embodiments of the present disclosure, validity of the first assistance information is further specifically described below.

In one aspect, during running of the foregoing timer, the first assistance information may always be valid.

In another aspect, before the terminal reports the second assistance information, the first assistance information may always be valid.

In some embodiments of the present disclosure, the following further specifically describes a start, stop, or restart moment of the timer.

In one aspect, the start moment of the timer includes at least one of the following moments:

a moment at which first indication information delivered by the network side device is received;

a preset time point after the first indication information delivered by the network side device is received;

a moment at which the first assistance information is reported to the network side device; and a preset time point after the first assistance information is reported to the network side device.

In another aspect, the stop moment or the restart moment of the timer may include at least one of the following moments:

a moment at which second indication information delivered by the network side device is received;

a preset time point after the second indication information delivered by the network side device is received;

a moment at which second assistance information is reported to the network side device; and a preset time point after the second assistance information is reported to the network side device.

The second indication information may be used for one of the following:

requesting (or asking) the terminal to report assistance information;

requesting (or asking) the terminal to report temporary capability information;

indicating that the terminal is allowed to enable a power saving mode; and indicating that the terminal is allowed to report assistance information.

The second indication information may be understood as indication information that is newer than the first indication information. Generally, the second indication information is delivered after the first indication information.

The foregoing related manner of reporting the first assistance information and the implementation of the related information carried in the first assistance information are also applicable to the second assistance information. Values of parameters in the second assistance information may be different from or may be the same as values of parameters in the first assistance information.

It can be learned from the foregoing implementations in some embodiments of the present disclosure that in some embodiments of the present disclosure, assistance information reported by the terminal to the network side device may include at least one of capability information, combination indication information of the capability information, power saving indication information, and power profile indication information. The information may assist the network side device in scheduling the terminal, thereby effectively reducing power consumption of the terminal and improving communication performance of the terminal. In some embodiments of the present disclosure, the assistance information may be actively reported to the network side device in a case that the terminal finds an internal exception, or may be reported in a case that indication information sent by the network side device is received, and reporting manners of the assistance information are flexible and diverse, so that different service requirements and different terminal states of the terminal can be met in a timely manner.

Figure 3:
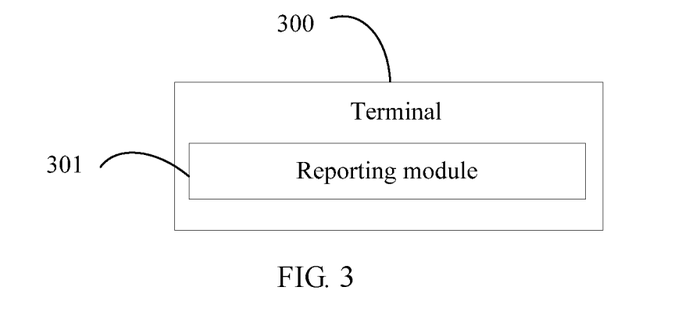
FIG. 3 is a structural diagram of a terminal according to some embodiments of the present disclosure.

FIG. 3 is a structural diagram of a terminal according to some embodiments of the present disclosure. As shown in FIG. 3, a terminal 300 includes:

a reporting module 301, configured to report first assistance information to a network side device, where The first assistance information includes at least one of capability information, combination indication information of the capability information, power saving indication information, and transmit power profile indication information.

Optionally, the first assistance information is reported in a case that first indication information sent by the network side device is received.

Optionally, the first indication information is used in one of the following:

requesting the terminal to report assistance information;

requesting the terminal to report temporary capability information;

indicating that the terminal is allowed to enable a power saving mode; and indicating that the terminal is allowed to report assistance information.

Optionally, the power saving indication information is used to indicate whether the terminal needs to save power or is in a power saving mode.

Figure 4:
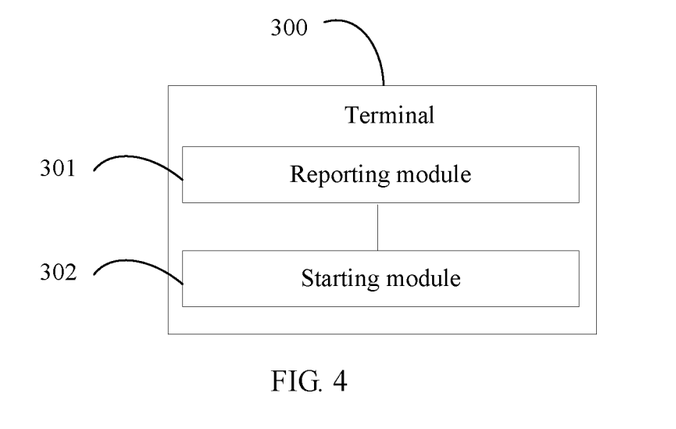
FIG. 4 is another structural diagram of a terminal according to some embodiments of the present disclosure.

Optionally, as shown in FIG. 4, the terminal 300 further includes:

a starting module 302, configured to start a timer, where
during running of the timer, the first assistance information is valid; and/or
during running of the timer, the terminal is not allowed to report second assistance information.

Optionally, a start moment of the timer includes at least one of the following moments:

a moment at which first indication information delivered by the network side device is received;

a preset time point after the first indication information delivered by the network side device is received;

a moment at which the first assistance information is reported to the network side device; and a preset time point after the first assistance information is reported to the network side device.

Optionally, a stop or restart moment of the timer includes at least one of the following moments:

a moment at which second indication information delivered by the network side device is received;

a preset time point after the second indication information delivered by the network side device is received;

a moment at which second assistance information is reported to the network side device; and a preset time point after the second assistance information is reported to the network side device.

Optionally, the second indication information is used in one of the following:

requesting the terminal to report assistance information;

requesting the terminal to report temporary capability information;

indicating that the terminal is allowed to enable a power saving mode; and indicating that the terminal is allowed to report assistance information.

Optionally, the first assistance information is reported through any one of message 1 Msg1, message 3 Msg3, and message 5 Msg5 in a random access process.

Optionally, the capability information, the combination indication information of the capability information, the power saving indication information, and the power profile indication information are distinguished through different preambles or preamble groups in Msg1.

Optionally, the power profile indication information includes at least one of a multi-antenna MIMO layer, a bandwidth part BWP configuration, a quantity of secondary cells Scell, and a carrier aggregation bandwidth.

Optionally, the combination indication information of the capability information is used to indicate a combination of all or partial capability information of the terminal.

Optionally, the first assistance information is reported on a basis of at least one of a BWP, a component carrier CC, a carrier, a terminal, and a frequency range FR.

Optionally, before the terminal reports second assistance information, the first assistance information is valid.

Optionally, if the terminal does not receive the first indication information, the terminal does not report the first assistance information.

It should be noted that the foregoing terminal 300 in some embodiments of the present disclosure may be a terminal in any implementation in the method embodiment and any implementation of the terminal in the method embodiment may be implemented by the foregoing terminal 300 in some embodiments of the present disclosure, and a same beneficial effect is achieved. To avoid repetition, details are not described herein again.

Figure 5:
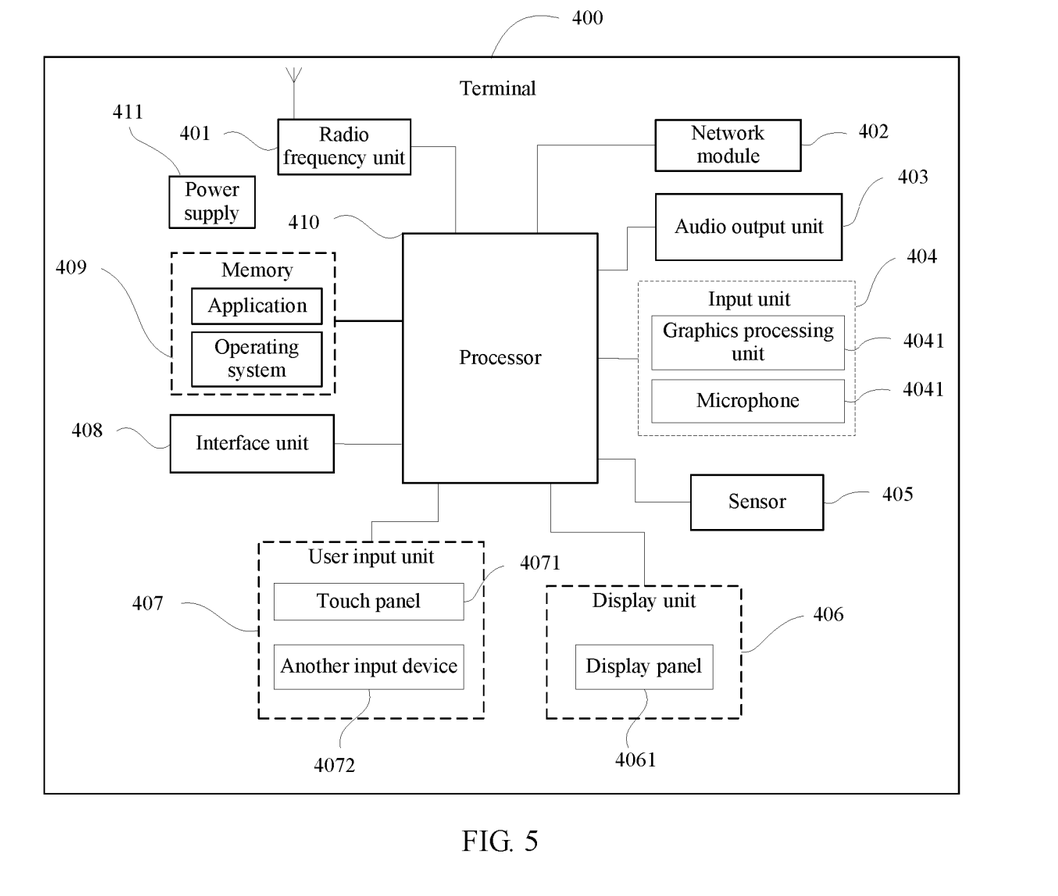
FIG. 5 is a schematic diagram of a hardware structure of a terminal according to some embodiments of the present disclosure.

FIG. 5 is a schematic structural diagram of hardware of a terminal implementing embodiments of the present disclosure. The terminal 400 includes but is not limited to: a radio frequency unit 401, a network module 402, an audio output unit 403, an input unit 404, a sensor 405, a display unit 406, a user input unit 407, an interface unit 408, a memory 409, a processor 410, a power supply 411, and other components. A person skilled in the art may understand that the structure of the terminal shown in FIG. 5 does not constitute a limitation on the terminal, and the terminal may include more or fewer components than those shown in the figure, or combine some components, or have different component arrangements. In some embodiments of the present disclosure, the terminal includes but is not limited to a mobile phone, a tablet computer, a notebook computer, a palmtop computer, an in-vehicle terminal, a wearable device, a pedometer, and the like.

The processor 410 is configured to:
reporting first assistance information to a network side device, where
the first assistance information includes at least one of capability information, combination indication information of the capability information, power saving indication information, and transmit power profile indication information.

Optionally, the first assistance information is reported in a case that first indication information sent by the network side device is received.

Optionally, the first indication information is used in one of the following:
requesting the terminal to report assistance information;
requesting the terminal to report temporary capability information;
indicating that the terminal is allowed to enable a power saving mode; and
indicating that the terminal is allowed to report assistance information.

Optionally, the power saving indication information is used to indicate whether the terminal needs to save power or is in a power saving mode.

Optionally, the processor 410 is further configured to:
start a timer, where
during running of the timer, the first assistance information is valid; and/or
during running of the timer, the terminal is not allowed to report second assistance information.

Optionally, a start moment of the timer includes at least one of the following moments:
a moment at which first indication information delivered by the network side device is received;
a preset time point after the first indication information delivered by the network side device is received;
a moment at which the first assistance information is reported to the network side device; and
a preset time point after the first assistance information is reported to the network side device.

Optionally, a stop or restart moment of the timer includes at least one of the following moments:
a moment at which second indication information delivered by the network side device is received;
a preset time point after the second indication information delivered by the network side device is received;
a moment at which second assistance information is reported to the network side device; and
a preset time point after the second assistance information is reported to the network side device.

Optionally, the second indication information is used in one of the following:
requesting the terminal to report assistance information;
requesting the terminal to report temporary capability information;
indicating that the terminal is allowed to enable a power saving mode; and
indicating that the terminal is allowed to report assistance information.

Optionally, the first assistance information is reported through any one of message 1 Msg1, message 3 Msg3, and message 5 Msg5 in a random access process.

Optionally, the capability information, the combination indication information of the capability information, the power saving indication information, and the power profile indication information are distinguished through different preambles or preamble groups in Msg1.

Optionally, the power profile indication information includes at least one of a multi-antenna MIMO layer, a bandwidth part BWP configuration, a quantity of secondary cells Scell, and a carrier aggregation bandwidth.

Optionally, the combination indication information of the capability information is used to indicate a combination of all or partial capability information of the terminal.

Optionally, the first assistance information is reported on a basis of at least one of a BWP, a component carrier CC, a carrier, a terminal, and a frequency range FR.

Optionally, before the terminal reports second assistance information, the first assistance information is valid.

Optionally, if the terminal does not receive the first indication information, the terminal does not report the first assistance information.

In some embodiments of the present disclosure, assistance information reported by the terminal to the network side device may include at least one of capability information, combination indication information of the capability information, power saving indication information, and power profile indication information. The information may assist the network side device in scheduling the terminal, thereby effectively reducing power consumption of the terminal and improving communication performance of the terminal. In some embodiments of the present disclosure, the assistance information may be actively reported to the network side device in a case that the terminal finds an internal exception, or may be reported in a case that indication information sent by the network side device is received, and reporting manners of the assistance information are flexible and diverse, so that different service requirements and different terminal states of the terminal can be met in a timely manner.

It should be understood that, in some embodiments of the present disclosure, the radio frequency unit 401 may be configured to receive and send information or a signal in a call process. Specifically, after receiving downlink data from a base station, the radio frequency unit 401 sends the downlink data to the processor 410 for processing. In addition, the radio frequency unit 401 sends uplink data to the base station. Generally, the radio frequency unit 401 includes, but is not limited to, an antenna, at least one amplifier, a transceiver, a coupler, a low noise amplifier, a duplexer, and the like. In addition, the radio frequency unit 401 may communicate with a network and another device through a wireless communication system.

The terminal provides wireless broadband Internet access for the user by using the network module 402, for example, helping the user to send and receive an e-mail, browse a web page, and access streaming media.

The audio output unit 403 may convert audio data received by the radio frequency unit 401 or the network module 402 or stored in the memory 409 into an audio signal and output the audio signal as a sound. In addition, the audio output unit 403 may further provide an audio output (for example, a call signal received voice, or a message received voice) related to a specific function implemented by the terminal 400. The audio output unit 403 includes a speaker, a buzzer, a telephone receiver, and the like.

The input unit 404 is configured to receive an audio signal or a video signal. The input unit 404 may include a graphics processing unit (GPU) 4041 and a microphone 4042. The graphics processing unit 4041 processes image data of a static image or video obtained by an image capture apparatus (such as, a camera) in a video capture mode or an image capture mode. A processed image frame may be displayed on the display unit 406. The image frame processed by the graphics processing unit 4041 may be stored in the memory 409 (or another storage medium) or sent by using the radio frequency unit 401 or the network module 402. The microphone 4042 may receive a sound and can process such sound into audio data. Processed audio data may be converted, in a call mode, into a format that can be sent to a mobile communication base station by using the radio frequency unit 401 for output.

The terminal 400 further includes at least one sensor 405, for example, a light sensor, a motion sensor, and other sensors. Specifically, the light sensor includes an ambient light sensor and a proximity sensor. The ambient light sensor may adjust luminance of the display panel 4061 based on brightness of ambient light, and the proximity sensor may disable the display panel 4061 and backlight when the terminal 400 approaches an ear. As a type of the motion sensor, an accelerometer sensor may detect an acceleration in each direction (generally, three axes), and detect a value and a direction of gravity when the accelerometer sensor is static, and may be used to recognize a terminal posture (such as screen switching between landscape and portrait modes, a related game, or magnetometer posture calibration), a function related to vibration recognition (such as a pedometer or a knock), and the like. The sensor 405 may further include a fingerprint sensor, a pressure sensor, an iris sensor, a molecular sensor, a gyroscope, a barometer, a hygrometer, a thermometer, and an infrared sensor. Details are not described herein.

The display unit 406 is configured to display information input by a user or information provided for a user. The display unit 406 may include a display panel 4061, and the display panel 4061 may be configured in a form of a liquid crystal display (LCD), an organic light-emitting diode (OLED), or the like.

The user input unit 407 may be configured to receive input numeral or character information, and generate key signal input related to user setting and functional control of the terminal. Specifically, the user input unit 407 includes a touch panel 4071 and another input device 4072. The touch panel 4071 is also referred to as a touchscreen, and may collect a touch operation performed by a user on or near the touch panel 4071 (such as an operation performed by a user on the touch panel 4071 or near the touch panel 4071 by using any proper object or accessory, such as a finger or a stylus). The touch panel 4071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor 410, and can receive and execute a command sent by the processor 410. In addition, the touch panel 4071 may be of a resistive type, a capacitive type, an infrared type, a surface acoustic wave type, or the like. The user input unit 407 may include another input device 4072 in addition to the touch panel 4071. Specifically, the another input device 4072 may include but is not limited to a physical keyboard, a functional button (such as a volume control button or a power on/off button), a trackball, a mouse, and a joystick. Details are not described herein.

Further, the touch panel 4071 may cover the display panel 4061. When detecting the touch operation on or near the touch panel 4071, the touch panel 4071 transmits the touch operation to the processor 410 to determine a type of a touch event, and then the processor 410 provides corresponding visual output on the display panel 4061 based on the type of the touch event. In FIG. 4, although the touch panel 4071 and the display panel 4061 are used as two independent parts to implement input and output functions of the terminal, in some embodiments, the touch panel 4071 and the display panel 4061 may be integrated to implement the input and output functions of the terminal. This is not specifically limited herein.

The interface unit 408 is an interface for connecting an external apparatus to the terminal 400. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset jack, and the like. The interface unit 408 may be configured to receive input (for example, data information and power) from the external apparatus and transmit the received input to one or more elements in the terminal 400, or may be configured to transmit data between the terminal 400 and the external apparatus.

The memory 409 may be configured to store software programs and various data. The memory 409 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 409 may include a high-speed random access memory, and may further include a nonvolatile memory, for example, at least one magnetic disk storage device, a flash storage device, or another volatile solid-state storage device.

The processor 410 is a control center of the terminal, and is connected to all parts of the entire terminal by using various interfaces and lines, and performs various functions of the terminal and processes data by running or executing the software program and/or the module that are stored in the memory 409 and invoking the data stored in the memory 409, to implement overall monitoring on the terminal. The processor 410 may include one or more processing units. Optionally, an application processor and a modem processor may be integrated into the processor 410. The application processor mainly processes an operating system, a user interface, an application, and the like. The modem processor mainly processes wireless communications. It can be understood that alternatively, the modem processor may not be integrated into the processor 410.

The terminal 400 may further include the power supply 411 (such as a battery) that supplies power to each component. Optionally, the power supply 411 may be logically connected to the processor 410 by using a power management system, so as to implement functions such as charging, discharging, and power consumption management by using the power management system.

In addition, the terminal 400 includes some function modules not shown, and details are not described herein.

Optionally, some embodiments of the present disclosure further provide a terminal, including a processor 410, a memory 409, and a program that is stored in the memory 409 and that can be run by the processor 410. When the program is executed by the processor 410, the processes of the foregoing assistance information reporting method embodiment are implemented and a same technical effect can be achieved. To avoid repetition, details are not described herein again.

Some embodiments of the present disclosure further provide a computer-readable storage medium. The computer-readable storage medium stores a computer program, and when the computer program is executed by a processor, the foregoing processes of the assistance information reporting method embodiment corresponding to the terminal or the network side are implemented and a same technical effect can be achieved. To avoid repetition, details are not described herein again. The computer-readable storage medium is, for example, a read-only memory (ROM for short), a random access memory (RAM for short), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

It can be understood that the embodiments described in the embodiments of the present disclosure may be implemented by hardware, software, firmware, middleware, microcode, or a combination thereof. For implementation with hardware, the processing unit may be implemented in one or more application specific integrated circuits (ASIC), a digital signal processor (DSP), a digital signal processing device (DSP Device, DSPD), a programmable logic device (PLD), a field-programmable gate array (FPGA), a general-purpose processor, a controller, a microcontroller, a microprocessor, another electronic unit for implementing the functions of the present disclosure, or a combination thereof.

For software implementation, the technology in the embodiments of the present disclosure may be implemented through modules (for example, procedures or functions) that perform the functions in the embodiments of the present disclosure. Software code may be stored in a memory and executed by a processor. The memory may be implemented in the processor or outside the processor.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. An assistance information reporting method, applied to a terminal and comprising:
   reporting first assistance information to a network side device, wherein
   the first assistance information comprises transmit power profile indication information;
   wherein the transmit power profile indication information comprises at least one of a multi-antenna multi-input multi-output (MIMO) layer, a bandwidth part (BWP) configuration, a quantity of secondary cells (Scell), and a carrier aggregation bandwidth;
   wherein the method further comprises: starting a timer, wherein
   during running of the timer, the first assistance information is valid; and/or
   during running of the timer, the terminal is not allowed to report second assistance information;
   wherein a start moment of the timer comprises at least one of the following moments:
   a moment at which first indication information delivered by the network side device is received;
   a preset time point after the first indication information delivered by the network side device is received;
   a moment at which the first assistance information is reported to the network side device; and
   a preset time point after the first assistance information is reported to the network side device.

2. The method according to claim 1, wherein the first assistance information is reported in a case that first indication information sent by the network side device is received.

3. The method according to claim 2, wherein the first indication information is used in one of the following:
   requesting the terminal to report assistance information;
   requesting the terminal to report temporary capability information;
   indicating that the terminal is allowed to enable a power saving mode; and
   indicating that the terminal is allowed to report assistance information.

4. The method according to claim 1, wherein the first assistance information further comprises power saving indication information, and the power saving indication information is used to indicate whether the terminal needs to save power or is in a power saving mode.

5. The method according to claim 1, wherein a stop or restart moment of the timer comprises at least one of the following moments:
   a moment at which second indication information delivered by the network side device is received;
   a preset time point after the second indication information delivered by the network side device is received;
   a moment at which second assistance information is reported to the network side device; and
   a preset time point after the second assistance information is reported to the network side device.

6. The method according to claim 1, wherein the first assistance information is reported through any one of message 1 (Msg1), message 3 (Msg3), and message 5 (Msg5) in a random access process.

7. The method according to claim 6, wherein the first assistance information further comprises at least one of capability information, combination indication information of the capability information, power saving indication information; and
   the capability information, the combination indication information of the capability information, the power saving indication information, and the power profile indication information are distinguished through different preambles or preamble groups in Msg1.

8. The method according to claim 7, wherein the combination indication information of the capability information is used to indicate a combination of all or partial capability information of the terminal.

9. The method according to claim 1, wherein the first assistance information is reported on a basis of at least one of a BWP, a component carrier (CC), a carrier, a terminal, and a frequency range (FR).

10. The method according to claim 1, wherein before the terminal reports second assistance information, the first assistance information is valid.

11. The method according to claim 2, wherein if the terminal does not receive the first indication information, the terminal does not report the first assistance information.

12. A terminal, comprising a memory, a processor, and a program that is stored in the memory and that can be run by the processor, wherein when the program is executed by the processor, the following steps are implemented:
   reporting first assistance information to a network side device, wherein
   the first assistance information comprises transmit power profile indication information;
   wherein the transmit power profile indication information comprises at least one of a multi-antenna multi-input multi-output (MIMO) layer, a bandwidth part (BWP) configuration, a quantity of secondary cells (Scell), and a carrier aggregation bandwidth;
   wherein when the program is executed by the processor, the following steps are further implemented: starting a timer, wherein
   during running of the timer, the first assistance information is valid; and/or
   during running of the timer, the terminal is not allowed to report second assistance information;
   wherein a start moment of the timer comprises at least one of the following moments:
   a moment at which first indication information delivered by the network side device is received;
   a preset time point after the first indication information delivered by the network side device is received;
   a moment at which the first assistance information is reported to the network side device; and
   a preset time point after the first assistance information is reported to the network side device.

13. The terminal according to claim 12, wherein the first assistance information is reported in a case that first indication information sent by the network side device is received.

14. The terminal according to claim 12, wherein the power saving indication information is used to indicate whether the terminal needs to save power or is in a power saving mode.

15. The terminal according to claim 12, wherein the first assistance information is reported through any one of message 1 (Msg1), message 3 (Msg3), and message 5 (Msg5) in a random access process.

16. A non-transitory computer-readable storage medium, wherein the non-transitory computer-readable storage medium stores a computer program, and when the computer program is executed by a processor, the following steps are implemented:
   reporting first assistance information to a network side device, wherein
   the first assistance information comprises transmit power profile indication information;
   wherein the transmit power profile indication information comprises at least one of a multi-antenna multi-input multi-output (MIMO) layer, a bandwidth part (BWP) configuration, a quantity of secondary cells (Scell), and a carrier aggregation bandwidth;
   wherein when the computer program is executed by the processor, the following steps are further implemented: starting a timer, wherein
   during running of the timer, the first assistance information is valid; and/or
   during running of the timer, the terminal is not allowed to report second assistance information;
   wherein a start moment of the timer comprises at least one of the following moments:
   a moment at which first indication information delivered by the network side device is received;
   a preset time point after the first indication information delivered by the network side device is received;
   a moment at which the first assistance information is reported to the network side device; and
   a preset time point after the first assistance information is reported to the network side device.

\* \* \* \* \*